United States Patent
Li et al.

(10) Patent No.: US 11,916,273 B1
(45) Date of Patent: Feb. 27, 2024

(54) BROADBAND ROTARY JOINT FOR MILLIMETER WAVE TRANSMISSION

(71) Applicant: Waymo LLC, Mountain View, CA (US)

(72) Inventors: Zhe Li, San Jose, CA (US); Samuel Lenius, Palo Alto, CA (US); Chia-Hung Lin, Santa Clara, CA (US); Craig Moriwaki, San Jose, CA (US); William Martin Peters, Jr., San Jose, CA (US); Kelvin Kwong, San Jose, CA (US); Robert J. Lockwood, San Carlos, CA (US); Peng Ye, Foster City, CA (US)

(73) Assignee: Waymo LLC, Mountain View, CA (US)

(*) Notice: Subject to any disclaimer, the term of this patent is extended or adjusted under 35 U.S.C. 154(b) by 706 days.

(21) Appl. No.: 17/067,536

(22) Filed: Oct. 9, 2020

(51) Int. Cl.
| | |
|---|---|
| H01P 1/00 | (2006.01) |
| G01S 7/481 | (2006.01) |
| G01S 17/931 | (2020.01) |
| H01P 1/06 | (2006.01) |
| H01P 3/12 | (2006.01) |
| H01Q 1/50 | (2006.01) |
| B60W 60/00 | (2020.01) |

(52) U.S. Cl.
CPC ............. *H01P 1/062* (2013.01); *G01S 7/481* (2013.01); *G01S 17/931* (2020.01); *H01P 3/12* (2013.01); *H01Q 1/50* (2013.01); *B60W 60/001* (2020.02); *B60W 2420/52* (2013.01)

(58) Field of Classification Search
CPC . H01P 1/062; H01P 3/12; G01S 7/481; G01S 17/931; H01Q 1/50; B60W 60/001; B60W 2420/52
USPC ....................... 250/503.1; 333/256, 257, 261
See application file for complete search history.

(56) References Cited

U.S. PATENT DOCUMENTS

| | | | |
|---|---|---|---|
| 2,513,205 A | 6/1950 | Shepard | |
| 3,011,137 A | 11/1961 | Albanese | |
| 4,373,779 A * | 2/1983 | Dorsey | G02B 6/3604 385/26 |
| 5,633,963 A * | 5/1997 | Rickenbach | G02B 6/3604 385/139 |
| 5,805,115 A * | 9/1998 | Pellerin | H01P 1/067 333/261 |
| 8,736,396 B2 | 5/2014 | Okada | |

(Continued)

*Primary Examiner* — Michael Maskell
(74) *Attorney, Agent, or Firm* — LOWENSTEIN SANDLER LLP

(57) ABSTRACT

A rotary joint includes a shaft having a first end, a second end, and a cavity. The rotary joint includes a first waveguide section having a first proximal end and a first distal end. The first proximal end of the first waveguide section is positioned within the cavity and secured to the inner surface of the shaft. The rotary joint includes a second waveguide section that includes a second proximal end and a second distal end. The second proximal end of the second waveguide section is positioned within the cavity of the shaft and unsecured to the inner surface of the shaft to form a radial gap between an outer surface of the second proximal end and a laterally adjacent portion of the inner surface of the shaft. The shaft and the first waveguide section are configured to rotate about the rotational axis and relative to the second waveguide section.

20 Claims, 9 Drawing Sheets

(56) References Cited

U.S. PATENT DOCUMENTS

| | | | |
|---|---|---|---|
| 8,786,385 B1* | 7/2014 | Lorenc | G02B 6/3604 |
| | | | 333/261 |
| 9,287,903 B2 | 3/2016 | Takeda et al. | |
| 10,054,746 B2 | 8/2018 | Rollinger et al. | |
| 10,742,315 B1* | 8/2020 | Li | G01S 17/86 |
| 2004/0135657 A1* | 7/2004 | Aramaki | H01P 1/161 |
| | | | 333/257 |
| 2012/0242428 A1 | 9/2012 | Blech et al. | |
| 2020/0014086 A1 | 1/2020 | Li et al. | |

\* cited by examiner

BROADBAND ROTARY JOINT FOR MILLIMETER WAVE TRANSMISSION

TECHNICAL FIELD

Aspects of the disclosure relate generally to electromagnetic signal transmission and more specifically, relate to a rotary joint for millimeter electromagnetic wave transmission.

BACKGROUND

Autonomous (self-driving) vehicles operate by sensing the outside environment with various electromagnetic (radar and optical) sensors and charting a driving path through the environment based on the sensed data. Additionally, the driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneous electromagnetic sensing data. Precision and safety of the driving path and of the speed regime selected by the autonomous vehicle depend significantly on the accuracy and completeness of the sensing data and on the ability of a driving algorithm to process the sensing data quickly and efficiently and to output correct instructions to the vehicle controls and the drivetrain.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1A:
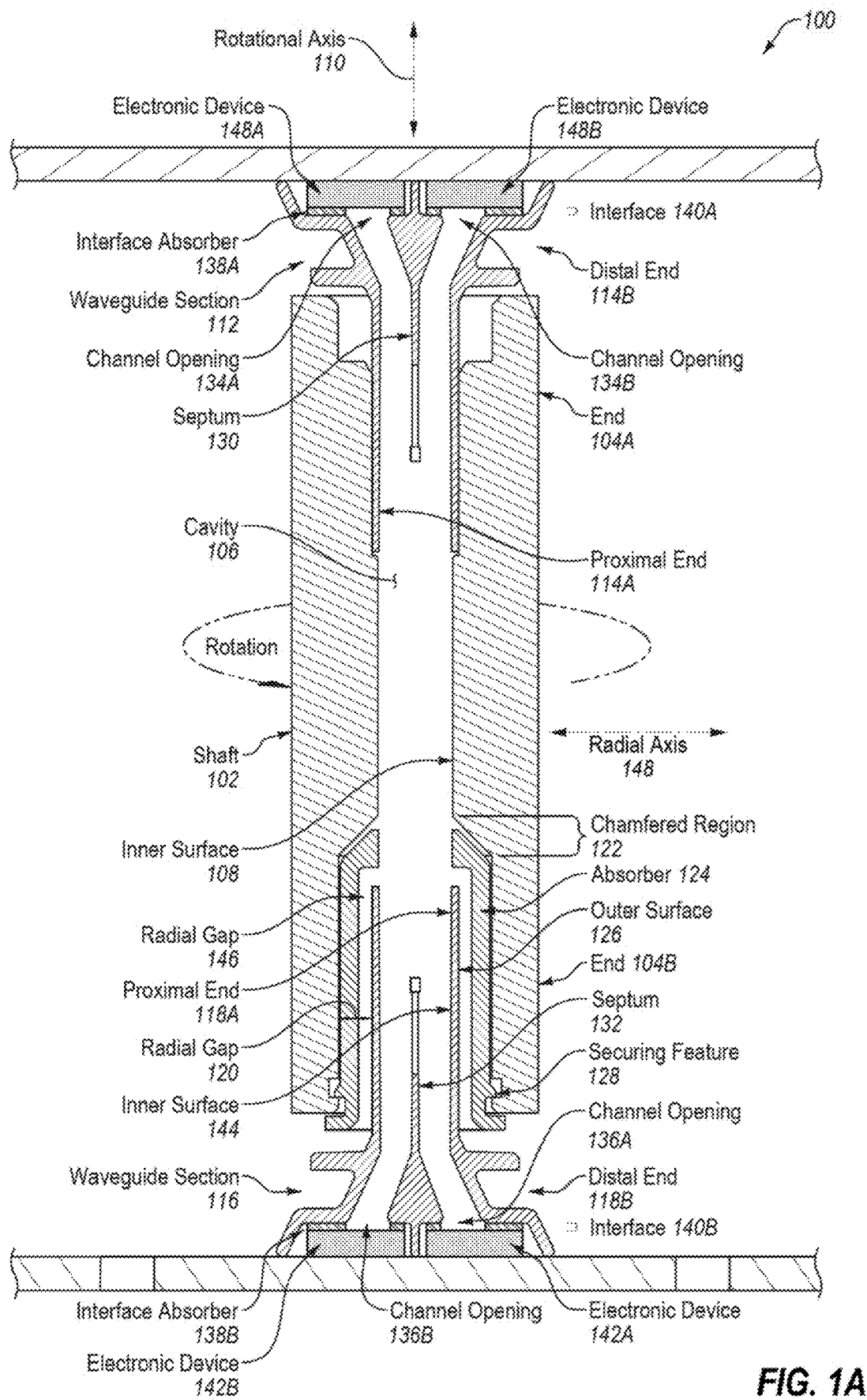
FIG. 1A is a diagram illustrating a rotary joint, in accordance with some implementations of the disclosure.

Autonomous vehicles can use a variety of sensors to sense the outside environment. One such sensor is a light detection and ranging (LiDAR) sensor unit. An autonomous vehicle may employ LiDAR technology to detect distances to various objects in the environment and the velocities of such objects. A LiDAR system emits one or more laser signals (pulses) that travel to an object and detects the arrived signals retro-reflected back from the object. By identifying a time delay between the signal emission and the arrival of the retro-reflected waves, the LiDAR system can determine a distance to the object. Furthermore, the LiDAR system can determine the velocity (speed and direction of motion) of the object by emitting two or more signals in a quick succession and detecting a changing position of the object with each additional signal. The intervals between successive signals can be short enough so that in the meantime the object does not change its position appreciably in relation to other objects of the environment, but still long enough to allow the LiDAR to detect small changes in the object's position with a high accuracy. In some instances, LiDAR can determine the velocity of the object by emitting one or more signals and measuring the doppler shift of the return signal(s), as can be the case for coherent LiDAR systems.

Support of LiDAR systems, and in particular LiDAR systems used in autonomous vehicles, has many challenges. LiDAR sensor units may rotate 360 degrees to capture data indicative of the surrounding environment. For instance, a LiDAR sensor unit can be mounted on a roof of an autonomous vehicle and perform 360-degree scans of the surrounding environment multiple times per second. Further, the LiDAR system of an autonomous vehicle can generate large amounts of data that is to be transferred at high bandwidths and high data rates in order to support timely decision making for actions taken by the autonomous vehicle (e.g., brake, turn, accelerate, etc.).

Aspects of the disclosure address the above and other challenges by using a rotary joint configured to support millimeter wave (e.g., 30-100 gigahertz (GHz) transmission. The rotary joint can include shaft with a first end, a second end, and a cavity defined by an inner surface of the shaft and extending thought the shaft from the first end to the second end. The shaft is oriented along a rotational axis extending from the first end to the second end. The rotary joint can include a first waveguide section oriented along the rotational axis and having a first proximal end and a first distal end. The first proximal end of the first waveguide section is positioned within the cavity of the shaft and secured to the inner surface of the shaft. The second waveguide section is oriented along the rotational axis and includes a second proximal end and a second distal end. The second distal end of the second waveguide section is positioned within the cavity of the shaft and is unsecured to the inner surface of the shaft to form a radial gap between the outer surface of the second proximal end of the second waveguide section and the laterally adjacent portion of the inner surface of the shaft. The shaft and the first waveguide section are configured to rotate about the rotational axis and relative to the second waveguide section.

In some implementations, the shaft can have radial symmetry about the rotational (e.g., axial) axis and have asymmetry about a radial axis. For example, a first circumference (e.g., diameter) of the inner surface of the shaft at the first end can be different than a second circumference of the inner surface of the shaft at the second end. For instance, the diameter of the shaft at the second end can be larger than the diameter of the shaft at the first end to provide both radial and axial clearance between the inner surface of the shaft and the second waveguide section and to allow the shaft to rotate freely around the second waveguide section.

In some implementations, the different circumferences of the inner surface of the shaft can be coupled together at a transition area referred to as a chamfered region. That is, the chamfered region can be located at an interface between the inner surface of the shaft having the first circumference and the inner surface of the shaft having the second circumference.

In some implementations, an absorber can be positioned around the outer surface of the second proximal end of the second waveguide section and between the outer surface of the second proximal end of the second waveguide section and the laterally adjacent portion of the inner surface of the shaft. The absorber can reduce the "effective" radial clearance (e.g. radial gap) between the outer surface of the second proximal end of the second waveguide section and the laterally adjacent portion of the inner surface of the shaft, but maintain enough radial clearance to allow the shaft to rotate freely with respect to the second waveguide section.

In some implementations, an interface absorber is positioned at an interface area between an antenna located outside the first waveguide section (or second waveguide section) and the outer surface at the distal end of the first waveguide section (or second waveguide section). The absorber includes an opening that aligns with a channel opening of the first waveguide section (or second waveguide section). The channel opening allows an electromagnetic signal to propagate in to and out of a waveguide section.

Accordingly, aspects of the disclosure provide a rotary join for improved electromagnetic signal transmission, and in particular the transmission of millimeter waves used in LiDAR systems of autonomous vehicles.

It can be noted that description of the rotary joint used with LiDAR systems of autonomous vehicles, as described herein, is provided for purposes of illustration rather than limitation. The rotary joint can be used for signal transmission in many other systems and should not be construed as limited to LiDAR systems or autonomous vehicles. It should be further noted that the rotary joint, as described herein, is described for use with the transmission of millimeter waves for purposes of illustration, rather than limitation. The rotary joint can be scaled to transmit electromagnetic signals with frequencies greater than or less than millimeter waves.

FIG. 1A is a diagram illustrating a rotary joint, in accordance with some implementations of the disclosure.

Rotary joint 100 (also referred to as "rotary data link" or "rotary waveguide" herein) is illustrated with a number of elements for purposes of illustration, rather than limitation. In other implementations, rotary joint 100 can include the same, different, fewer, or additional elements. The elements of rotary joint, such as rotary joint 100 are described with relative positional relationships, such as up, down, top, bottom, front, and end, vertical, horizontal, and so forth for purposes of illustration, rather than limitation. For example and for the purpose of illustration, rotational axis 110 is described as a vertical axis and can be used as a reference to describe other relative positional relationships. It can be noted that assigning other positional relationships to the elements of rotary joint, such as rotary joint 100 is within the scope of the disclosure. "Proximal" as used herein can refer to a feature of an element that is closer to the center of shaft 102 (e.g., about the radial axis 148), unless otherwise described. "Distal" as used herein can refer to a feature of an element that is farther from the center of shaft 102, unless otherwise described.

Rotary joint 100 can include shaft 102 (also referred to as "bearing shaft" or "spindle" herein), waveguide section 112, and waveguide section 116. A waveguide section can also be referred to as "septum polarizer" herein. As noted above, the orientation of rotary joint 100 can be one of many orientations of rotary joint 100. In the illustrated example, rotary joint 100 is positioned vertically. For instance, rotary joint 100 can be mounted vertically to a roof of an autonomous vehicle where waveguide section 116 is mounted to the roof of the vehicle and shaft 102 and waveguide section 112 extend vertically away from the roof of the vehicle.

In some implementations, shaft 102 includes end 104A, end 104B, and a cavity 106. Cavity 106 of shaft 102 is defined by an inner surface 108 of the shaft 102. The cavity 106 extends through the shaft 102 from the end 104A to the end 104B. The cavity 106 of shaft 102 is illustrated as circular for purposes of illustration rather than limitation. In other implementations, the shape of the cavity 106 of the shaft 102 can be any shape. The shaft 102 is oriented along a rotational axis 110 that extends between end 104A and end 104B. In some implementations, the rotary joint 100 is aligned such that the center (e.g., accounting for tolerances such as manufacturing, assembly, environmental) of the rotary joint 100 is substantially aligned along rotational axis 110.

In some implementations, waveguide section 112 is oriented along the rotational axis 110. Waveguide section 112 includes proximal end 114A and distal end 114B. Proximal end 114A of the waveguide section 112 is positioned within the cavity 106 of the shaft 102. In implementations, waveguide section 112 is secured (e.g., coupled) to the inner surface 108 of the shaft 102 at end 104A. In some implementations, waveguide section 112 is coupled to inner surface 108 of the shaft 102 such that at least some portion of the inner surface 108 of the shaft 102 at end 104A contacts the outer surface of the proximal end 114A of the waveguide section 112. In some implementations, the distance between the outer surface of the proximal end 114A of the waveguide section 112 and the inner surface 108 of the shaft 102 is non-zero but negligible and due to one or more of manufacturing, assembly, or environmental tolerances (e.g., changes in dimensions due to environmental factors such as thermal changes, vibration, acceleration, or other external forces).

In some implementations, waveguide section 116 is oriented along the rotational axis 110. Waveguide section 116 includes proximal end 118A and distal end 118B. The proximal end 118A of the waveguide section 116 is positioned within the cavity 106 of the shaft 102 and unsecured (e.g., uncoupled) to the inner surface 108 of the shaft 102 at end 104B to form a radial gap 120 (radial clearance, e.g., air gap) between an outer surface 126 of the proximal end 118A of waveguide section 116 and a laterally adjacent portion of the inner surface 108 of the shaft 102. The radial gap 120 between the waveguide section 116 and the shaft 102 allows the shaft 102 to rotate around the waveguide section 116 unencumbered and without contacting the waveguide section 116. In some implementations, radial gap 120 can range from 1 mm to 15 mm and depend on or more of manufacturing, assembly, or environmental tolerances. It can be noted that radial gap 120 illustrates a radial clearance between waveguide section 116 and the inner surface 108 of the shaft 102. It can be further noted that axial clearance between the proximal end 118A of the waveguide section 116 and the chamfered region 122 of the shaft 102 can be implemented as illustrated. The radial and axial clearance allows for unencumbered rotation of the shaft 102 about the rotational axis 110 without contacting waveguide section 112 while accounting for manufacturing, assembly, or environmental tolerances and in particular for the forces on the rotary joint 100 experienced in an automotive environment.

In some implementations, the shaft 102 and waveguide section 112 are configured to rotate about the rotational axis 110. The shaft 102 and waveguide section 112 are configured to rotate 360 degrees in any direction (e.g., clockwise or counter-clockwise). In some implementations, the shaft 102 and waveguide section 112 can be configured to rotate at a given frequency. In some implementations, waveguide section 116 is configured to remain stationary (e.g., rotationally static) such that the shaft 102 and waveguide section 112 rotate about the rotational axis 110 and relative to waveguide section 116.

In some implementations, waveguide section 112 includes septum 130 that is aligned with the rotational axis 110 and extends from the distal end 114B of the waveguide section 112 and towards the proximal end 114A of the waveguide section 112. In some implementations, waveguide section 116 includes septum 132 that is aligned with the rotational axis 110 and extends from the distal end 118B of waveguide section 116 and towards the proximal end 118A of the waveguide section 116. It can be noted that as waveguide section 112 and shaft 102 rotate around the rotational axis 110, the orientation of septum 130 with respect to septum 132 changes.

In some implementations, waveguide section 112 includes one or more channel openings, such as channel opening 134A and channel opening 134B. Channel opening 134A extends from the outer surface at the distal end 114B of the waveguide section 112 to an inner surface at the distal end 114B of waveguide section 112. The channel opening 134A is adjacent to septum 130. The channel opening 134A provides a path for signals external to the waveguide section 112 to propagate into the cavity of waveguide section 112. Channel opening 134B is similar to the channel opening 134A but located at the other side of septum 130. Channel opening 134B can have similar characteristics as channel opening 134A, which will not be repeated for purposed of brevity.

In some implementations, waveguide section 116 includes one or more channel openings, such as channel opening 136A and channel opening 136B. Channel opening 136A extends from the outer surface 126 at the distal end 118B of waveguide section 116 to the inner surface 144 at the distal end 118B of waveguide section 116. The channel opening 136A is adjacent to septum 132. Channel opening 136A of waveguide section 116 corresponds to channel opening 134A of waveguide section 112 to cause an electromagnetic signal transmitted via channel opening 134A to be received through channel opening 136A, and vice versa. It can be noted that channel opening pairs, such as channel opening 134A and channel opening 136A, are illustrated as located at opposite sides of rotary joint 100. It can be further noted that the relative orientation between the channel openings pairs can change based on the rotation of waveguide section 112. The septum 130 and 132 can direct or cause the electromagnetic signal to travel from a particular channel opening and to a corresponding channel opening. Channel opening 136B is similar to channel opening 136A but located at the other side of the septum 132. Channel opening 136B can have similar characteristics as channel opening 136A, which will not be repeated for purposes of brevity.

Channel opening 134A of waveguide section 112 and channel opening 136A of waveguide section 116 correspond to channel A. Channel opening 134B of waveguide section 112 and channel opening 136B of waveguide section 116 correspond to channel B. Electronic devices, such as discrete antennas or processing devices with integrated antennas can be coupled to each channel to transceive electromagnetic signals, as discussed further below.

Waveguide section 112 includes a cavity that is defined by the inner surface of the waveguide section 112. Waveguide section 116 also includes a cavity that is defined by the inner surface 144 of the waveguide section 116. The cavities of waveguide section 112 and waveguide section 116 are illustrated as circular for purposes of illustration, rather than limitation. In other implementations, the cavities of waveguide section 112 or waveguide section 116 can be any other shape. In some implementations, the shape of the cavities of waveguide section 112 or waveguide section 116 can be the same shape as the cavity 106 of shaft 102.

In some implementations, the diameter (inner or outer) of distal end 114B of waveguide section 112 and the diameter of distal end 118B of waveguide section 116 can be approximately the same diameter with respect to manufacturing, assembly, and environmental tolerances.

In some implementations, the shaft 102 can have radial symmetry about the rotational (e.g., axial) axis 110 and have asymmetry about a radial axis 148. In some implementations, the inner surface 108 of the shaft 102 can have a circumference (e.g., diameter) at the end 104A that is different than a circumference of the inner surface 108 at the end 104B. The difference in circumference can allow for the axial clearance and radial clearance between the waveguide section 116 and inner surface 108 of shaft 102, as described above. In some implementations, the circumference of the inner surface 108 at the end 104A is smaller than the circumference of the inner surface 108 at end 104B. Is some implementations, the circumference of the inner surface 108 of shaft 102 from below the proximal end 114A of waveguide section 112 to the chamfered region 122 is a consistent or same circumference (e.g., diameter) with respect to manufacturing tolerances. Similarly, the circumference of the inner surface 108 of shaft 102 from end 104B to the chamfered region 122 is a consistent or same circumference with respect to manufacturing tolerances. In some implementations and as illustrated, the difference in circumferences between the end 104A of shaft 102 and end 104B of shaft 102 create an asymmetry about the radial axis 148. In other implementations, shaft 102 can be symmetric about the radial axis 148. For example, end 104A of shaft 102 can be configured to match end 104B of shaft 102 such that both ends 104 have larger circumferences than the central body of shaft 102. In such implementations, waveguide section 112 can still be coupled to the inner surface 108 of shaft 102 so that no radial clearance exists between the outer surface of waveguide section 112 and the laterally adjacent inner surface 108 of shaft 102.

In some implementations, the inner surfaces 108 of shaft 102 with different circumferences can be coupled together at a transition area referred to as the chamfered region 122. That is, the chamfered region 122 is located at an interface between the inner surface 108 of the shaft 102 having a first circumference and the inner surface 108 of the shaft 102 having a second circumference. In some implementations, chamfered region 122 is configured at an angle that is greater than 10 degrees and less than 90 degrees with respect to the inner surface 108 of the shaft 102 adjacent to the chamfered region 122. In some implementations, the inner surface 108 of the shaft 102 at the chamfered region 122 is configured at approximately 45 degrees with respect to manufacturing, assembly, and environmental tolerances (±1 degree).

In some implementations, absorber 124 can be used to assist electromagnetic signal propagation through the rotary joint 100 (e.g., to avoid reflection losses due to impedance discontinuity and electromagnetic signal leakage, which can cause electromagnetic signal distortion). Absorber 124 can include one or more radio frequency (RF) absorbing materials that reduce reflection of electromagnetic signals. In some implementations, the RF absorbing material can attenuate, at least partially, the electromagnetic signals incident to the absorber 124. In some implementations, the RF absorbing material can be selected for a particular frequency range of electromagnetic signals so that the selected RF absorbing materials effectively attenuate electromagnetic signals at the frequency range of interest. In some implementations, the RF absorbing materials can be selected for the operational frequency range for which the rotary joint 100 is used.

In some implementations, absorber 124 is positioned around the outer surface 126 of the proximal end 118A of the waveguide section 116 and between the outer surface 126 of the proximal end 118A of the waveguide section 116 and the laterally adjacent the inner surface 108 of the shaft 102. As illustrated, the absorber 124 can be positioned within radial gap 120 between the outer surface 126 of waveguide section 116 and the laterally adjacent inner surface 108 of shaft 102. The absorber 124 can reduce the "effective" radial clearance (e.g. radial gap 146) between the outer surface of the proximal end 118A of the waveguide section 116 and the laterally adjacent the inner surface 108 of the shaft 102, while maintaining enough radial clearance to allow the shaft to rotate freely with respect to the waveguide section 116.

In some implementations, the distal end 114B of waveguide section 112 and the distal end 118B of waveguide section 116 can include or be coupled to one or more electronic devices, such as electronic device 148A and electronic device 148B of waveguide section 112, and electronic device 142A and electronic device 142B of waveguide section 116. In some implementations, an electronic device represents one or more of a discrete antenna, an RF processing device (with or without an integrated antenna), or sensor unit, among other electronic devices.

In some implementations, an interface area, such as interface 140A and interface 140B, is located between the electronic devices and the distal end of a waveguide section. For example, interface 140A is located between electronic device 148A and 148B and the distal end 114B of waveguide section 112. Interface 140B is located between electronic device 142A and 142B and the distal end 118B of waveguide section 116. The interface area can have an axial clearance or gap between the top of the electronic devices (e.g., closest to the distal end of the waveguide section) and the outer surface of the waveguide section.

Figure 3A:
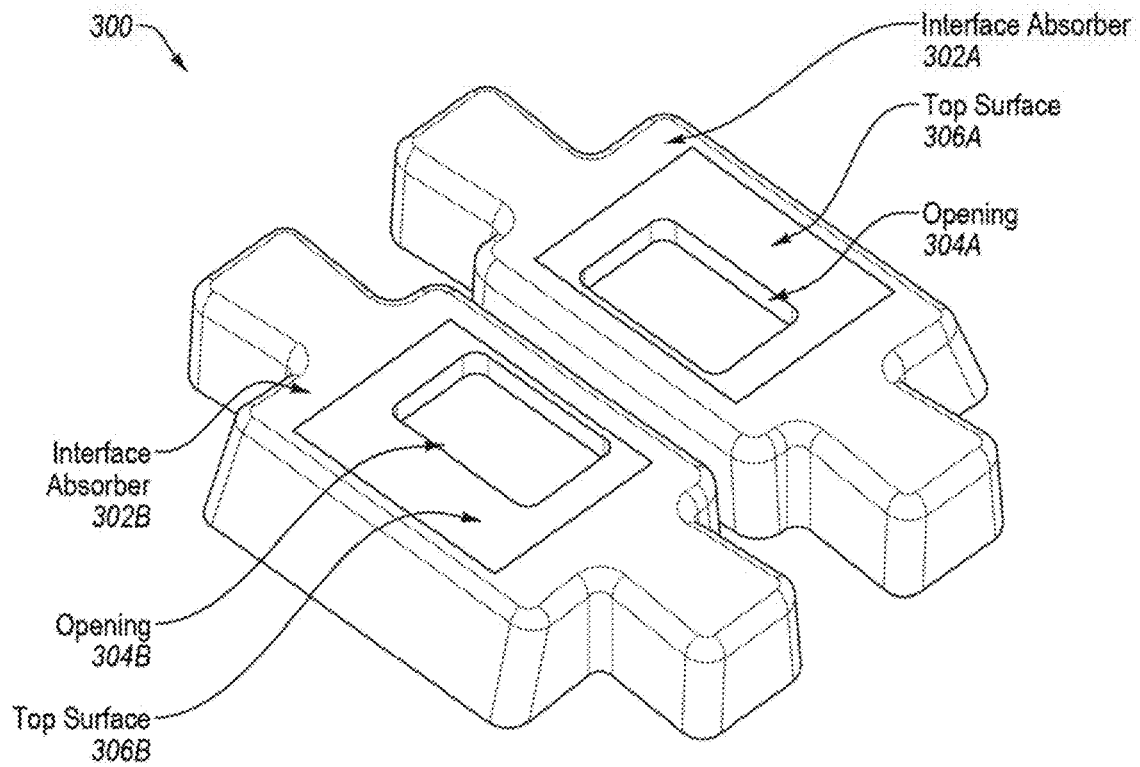
FIG. 3A is a diagram illustrating interface absorbers of a rotary joint, in accordance with implementations of the disclosure.
Figure 3A:
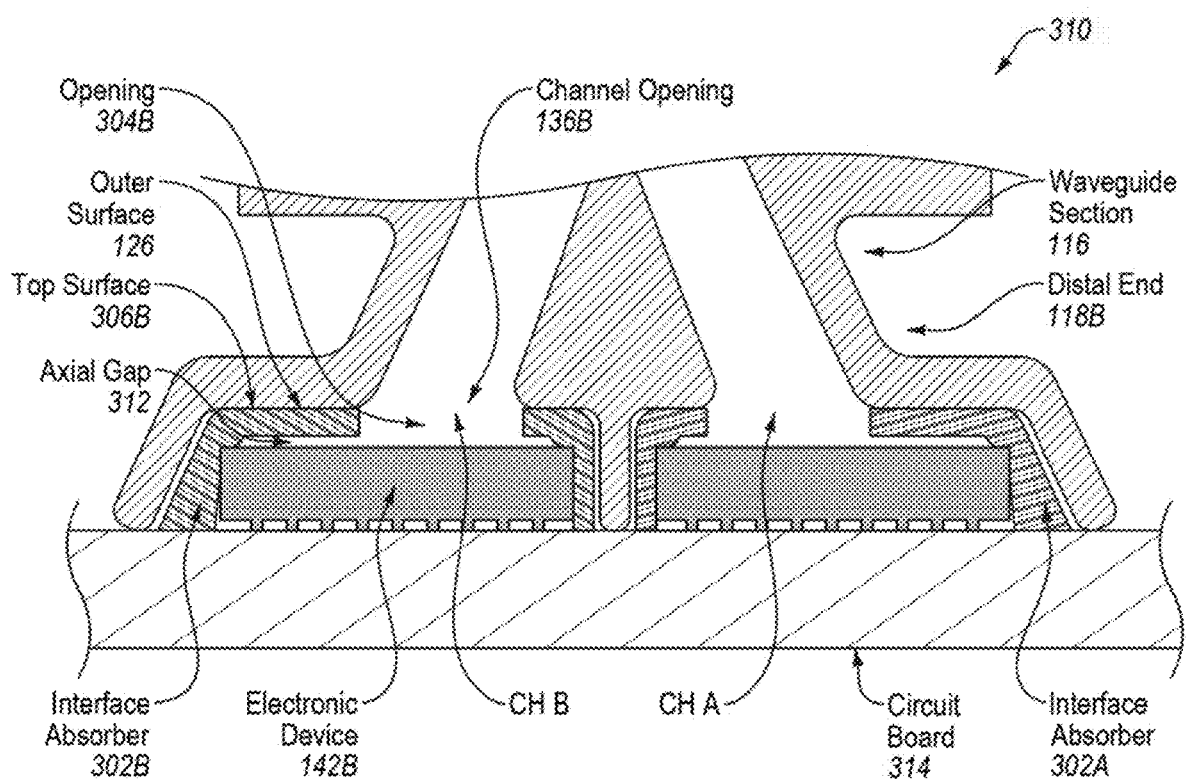
Figure 3B:
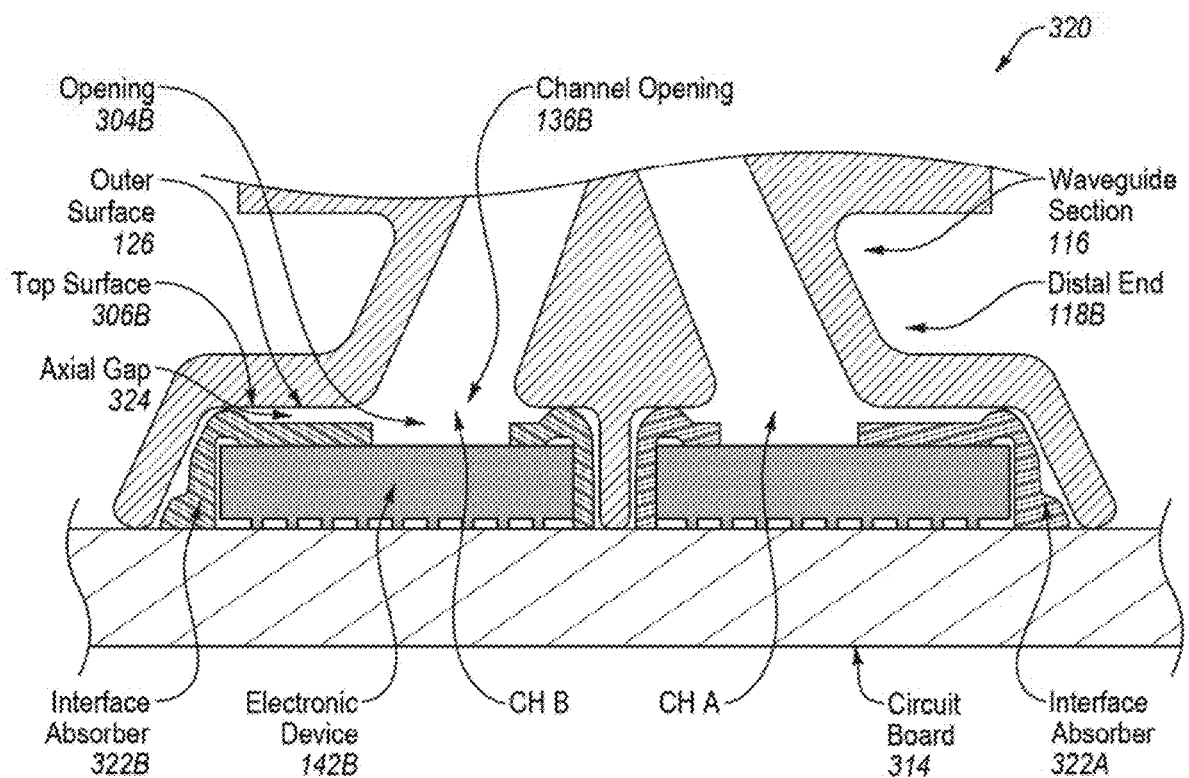
FIG. 3B is a diagram illustrating interface absorbers of a rotary joint, in accordance with implementations of the disclosure.
Figure 3C:
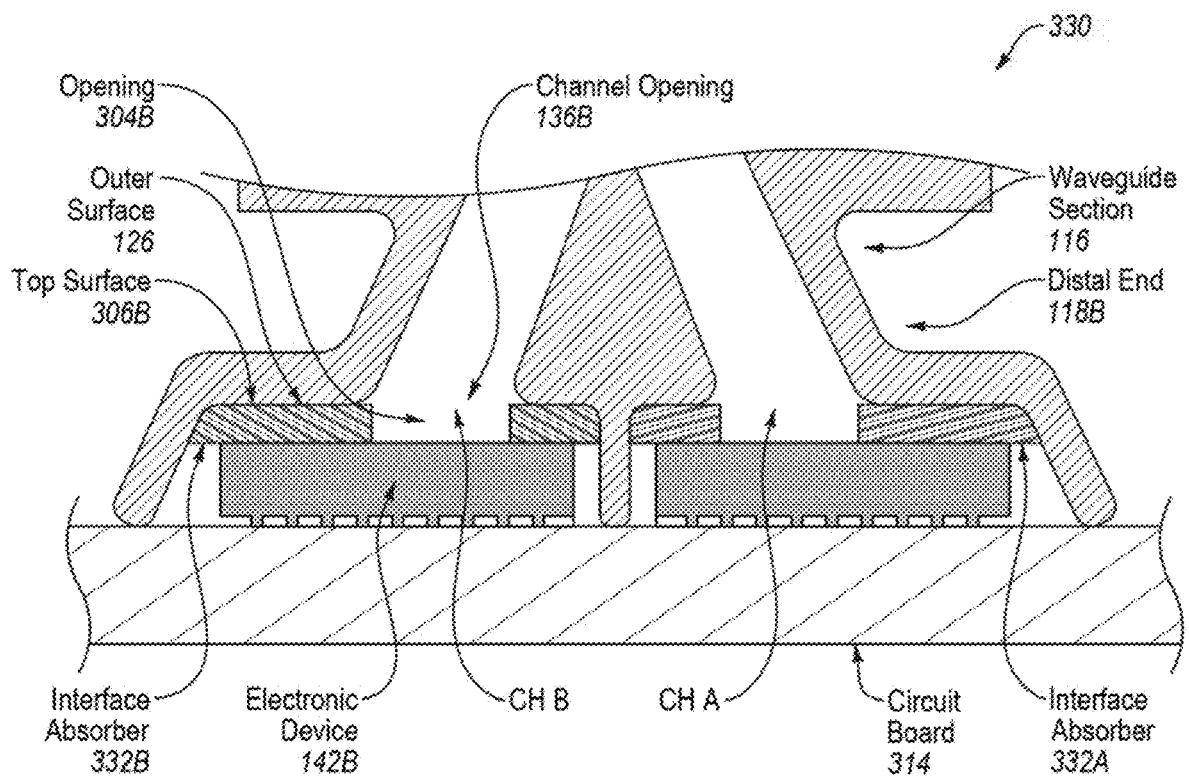
FIG. 3C is a diagram illustrating interface absorbers of a rotary joint, in accordance with implementations of the disclosure.

In some implementations, the interface area can include an interface absorber. For example, interface absorber 138A is located at the interface 140A of waveguide section 112 and interface absorber 138B is located at the interface 140B of waveguide section 116. It can be noted that interface absorber 138A or interface absorber 138B can include one or more discrete absorbers as illustrated in FIGS. 3A-3C. In implementations where the electronic device includes a discrete antenna or integrated antenna (e.g., integrated in an RF processing device), the interface absorber can be positioned at the interface area between the antenna and the outer surface at the distal end of the waveguide section. In some implementations, the interface absorber includes an opening that aligns with the channel openings. For example, interface absorber 138A includes two openings that align with channel opening 134A and channel opening 134B. Interface absorber 138B includes two openings that align with channel opening 136A and channel opening 136B.

The placement of the interface absorber(s) "effectively" reduces or eliminates the axial clearance between the distal end of the waveguide section and the adjacent electronic devices. For example, the interface absorber can be positioned within the interface area such that a first surface of the interface absorber contacts the top of the electronic device and/or a second surface of the interface absorber contacts the outer surface of the distal end of the waveguide section. The electromagnetic signals can propagate through the opening (s) of the interface absorber. The position of the interface absorber at the interface area can help reduce losses due to reflection or leakage at the interface area. The interface absorber can include one or more RF absorber materials as described above.

Figure 1B:
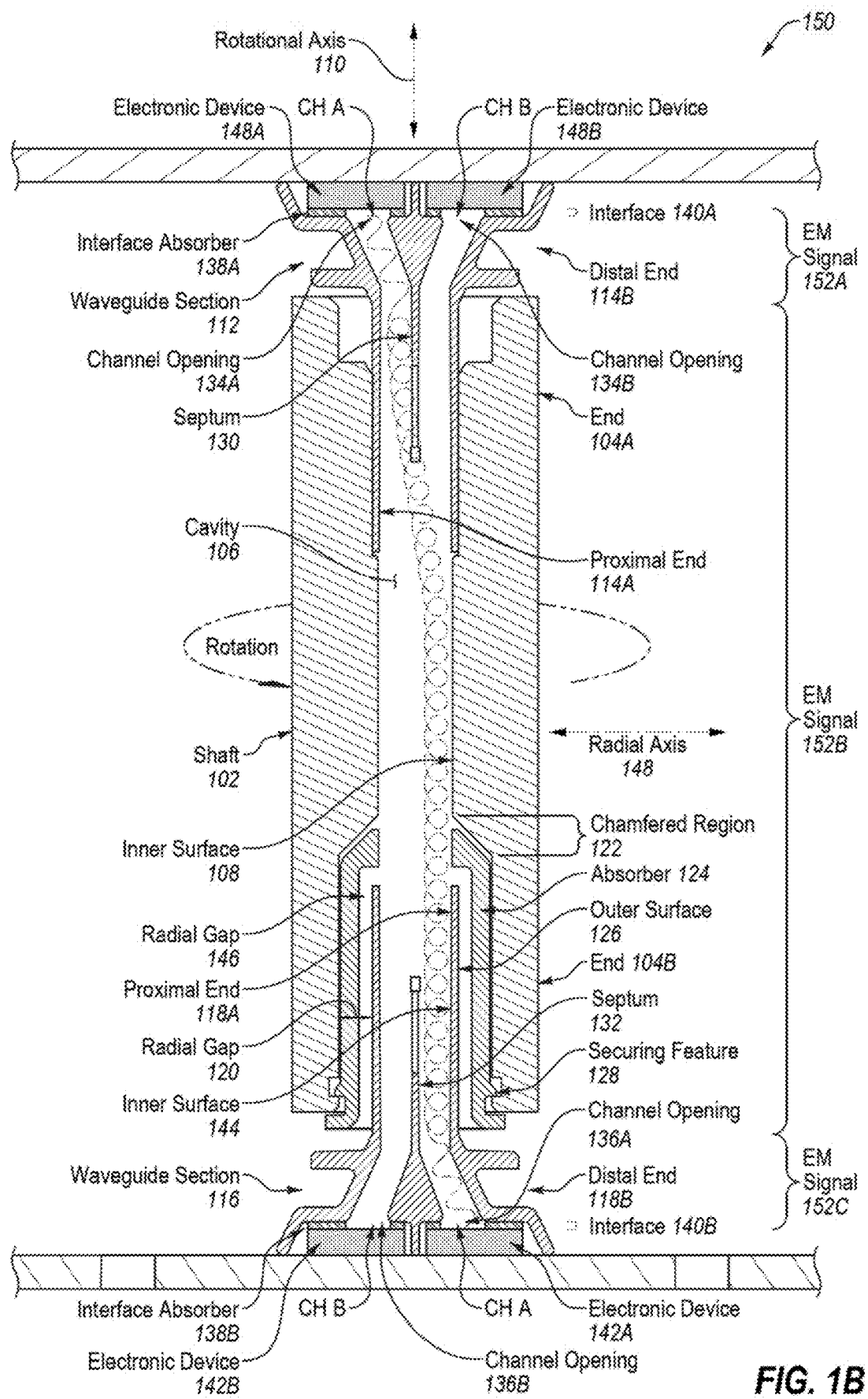
FIG. 1B is a diagram illustrating electromagnetic signal transmission using a rotary joint, in accordance with some implementations of the disclosure.

FIG. 1B is a diagram illustrating electromagnetic signal transmission using a rotary joint, in accordance with some implementations of the disclosure. Rotary joint 150 can be the same as or similar to rotary joint 100 of FIG. 1A. The elements and description of rotary joint 100 can apply to rotary joint 150, and are not repeated for the sake of brevity. However, some elements of FIG. 1A are used below to help illustrate rotary joint 150 of FIG. 1B.

Rotary joint 150 is configured to facilitate the transmission of electromagnetic signals. In some implementations, rotary joint 150 is configured to facilitate the transmission of millimeter wave electromagnetic signals from 1 to 300 gigahertz (GHz), and in particular electromagnetic signals in the 30-100 GHz range.

In some implementations, rotary joint 150 can include one or more channels configured to transmit electromagnetic signals. Rotary joint 150, as illustrated, is a dual-channel device with channel A (CH A) and channel B (CH B). Rotary joint 150, and in particular each channel of rotary joint 150, can be operated to transmit electromagnetic signals unidirectionally or bi-directionally. Rotary joint 150 can transmit signals in the multiple channels concurrently using for example, one or more signal diversification techniques such as polarization diversification or frequency diversification. The rotary joint 150 can be operated in half-duplex or full-duplex modes.

As illustrated, electromagnetic signal 152 is shown in portion represented by electromagnetic signal 152A, electromagnetic signal 152B, and electromagnetic signal 152C. The transmission of electromagnetic signal 152 using channel A is shown for purposes of illustration, rather than limitation.

In some implementations, electronic device 148A includes an antenna located axially adjacent to an outer surface at the distal end 114B of waveguide section 112. The antenna of electronic device 148A generates electromagnetic signal 152 and transmits the electromagnetic signal 152 in the direction of the cavity of waveguide section 112. In some implementations, the antenna of electronic device 148A can generate a polarized wave of a particular type including a linear polarized wave, a circular polarized wave, or an elliptical polarized wave. In some implementations, the type of polarized wave can be generated to have and a particular direction including a right-hand circular polarized wave, left-hand circular polarized wave, right-hand elliptical polarized wave, or left-hand elliptical polarized wave. In the illustrated implementation, the antenna of electronic device 148A generates electromagnetic signal 152A representing a linear polarized wave.

In some implementations, electromagnetic signal 152A is coupled (e.g., directed or cause to propagate) from the antenna of electronic device 148A through the opening of the interface absorber 138A that is positioned at the interface area 140A between the antenna and the outer surface of the distal end 114B of waveguide section 112. The opening of the interface absorber 138A is aligned with the channel opening 134A at the distal end 114B of the waveguide section 112.

In some implementations, the electromagnetic signal 152A is coupled via the channel opening 134A at the distal end 114B of the waveguide section 112 of the rotary joint 150 into the cavity of the waveguide section 112.

In some implementations, septum 130 of the waveguide section 112 causes the electromagnetic signal 152A to polarize into a different type (or different direction) of polarized wave. In some implementations, the septum 130 of the waveguide section 112 causes the linear polarized wave (e.g., electromagnetic signal 152A) to polarize in a first direction to form a first-directional polarized wave (e.g., electromagnetic signal 152B), such as a first-directional circular polarized wave (e.g., right-hand circular polarized wave).

In some implementations, the electromagnetic signal 152B is coupled through the proximal end 114A of the waveguide section 112 to the cavity 106 of shaft 102 of rotary joint 150. The cavity 106 is defined by the inner surface 108 of shaft 102 and extends from end 104A of shaft 102 to the end 104B of shaft 102. The proximal end 114A of the waveguide section 112 is positioned within the cavity 106 of shaft 102 and secured to the inner surface 108 of shaft 102.

In some implementations, the electromagnetic signal 152B is coupled through the cavity 106 of shaft 102 towards the end 104B of shaft 102. In some implementations, the electromagnetic signal 152B is coupled through the chamfered region 122 of the shaft 102 towards the waveguide section 116.

In some implementations, the electromagnetic signal 152B is coupled through a top portion of absorber 124. The top portion of the absorber 124 can extend above the waveguide section 116 in the axial direction. For example, the electromagnetic signal 152B is coupled from the cavity 106 of shaft 102 through an opening in the absorber 124 that is positioned around the outer surface 126 of the proximal end 118A of the waveguide section 116 and between the outer surface 126 of the proximal end 118A of waveguide section 116 and the laterally adjacent portion of the inner surface 108 of shaft 102.

In some implementations, the electromagnetic signal 152B is coupled from the cavity 106 of shaft 102 to the proximal end 118A of waveguide section 116 of rotary joint 150 (e.g., via the top portion of absorber 124). The proximal end 118A of waveguide section 116 is positioned within the cavity 106 of shaft 102 and is unsecured to the inner surface 108 of shaft 102 to form a radial gap 120 between the outer surface 126 of the proximal end 118A of waveguide section 116 and a laterally adjacent portion of the inner surface 108 of shaft 102. The shaft 102 and the waveguide section 112 are configured to rotate about the rotational axis 110 relative to the waveguide section 116.

In some implementations, the electromagnetic signal 152B is coupled from the proximal end 118A of waveguide section 116 towards the distal end 118B of waveguide section 116. In some implementations, the septum 132 of waveguide section 116 causes the electromagnetic signal 152B to depolarize into a different type (or different direction) of polarized wave. In some implementations, the septum 132 of the waveguide section 116 causes the first-directional polarized wave (e.g., electromagnetic signal 152B) to de-polarize to form a polarized wave (e.g., electromagnetic signal 152C), such as a linear polarized wave.

In some implementations, the waveguide section 112 and shaft 102 rotate about the rotational axis 110 and rotate with respect to waveguide section 116. As such, septum 130 rotates about the rotational axis 110 and rotates with respect to septum 132 of waveguide section 116. As such, the radial angle between septum 130 and septum 132 changes over time. Waveguide section 116, and more generally rotary joint 150, is configured to receive electromagnetic signal 152B irrespective of the radial angle between septum 130 and septum 132

In some implementations, electromagnetic signal 152C is coupled at the distal end 118B of waveguide section 116 through channel opening 136A of waveguide section 116. In some implementations, the electromagnetic signal 152C is coupled from the channel opening 136A of waveguide section 116 through the opening of interface absorber 138B at channel A. The interface absorber 138B is positioned at interface area 140B between the outer surface of the distal end 118B of waveguide section 116 and an antenna of electronic device 142A.

In some implementations, electromagnetic signal 152C is received, via an antenna (of electronic device 142A) located axially adjacent to the outer surface of the distal end 118B of the waveguide section 116, from the opening of the interface absorber 138B.

The transmission and propagation of electromagnetic signal 152 through rotary joint 150 has been provided for purposes of illustration, rather than limitation. It should be understood that the direction of transmission can be opposite as described (i.e., from the antenna of electronic device 142A to antenna of electronic device 148A) in a similar manner as described above. Similarly, the transmission of an electromagnetic signal using channel B can be performed in a similar manner as described with respect to the transmission of electromagnetic signal 152 using channel A, and will not be repeated for the sake of brevity. Some differences in the transmission of an electromagnetic signal using channel B is further described below.

Channel B can transmit an electromagnetic signal concurrently with the transmission of electromagnetic signal 152 at channel A. In some implementations, signal diversification can be used to effectively separate the electromagnetic signals of channel A and channel B. In some implementations, the septum 130 polarizes the electromagnetic signal transmitted using channel B in a different direction than channel A. For example, a linear polarized wave transmitted from the antenna of electronic device 148B at channel B can be polarized the electromagnetic signal in an opposite direction than channel A to form a second directional-polarized wave (e.g., left-hand circular polarized wave). The polarized wave (e.g., right-hand circular polarized wave) of channel A can be orthogonal to the polarized wave (e.g., left-hand circular polarized wave) of channel B.

Figure 2A:
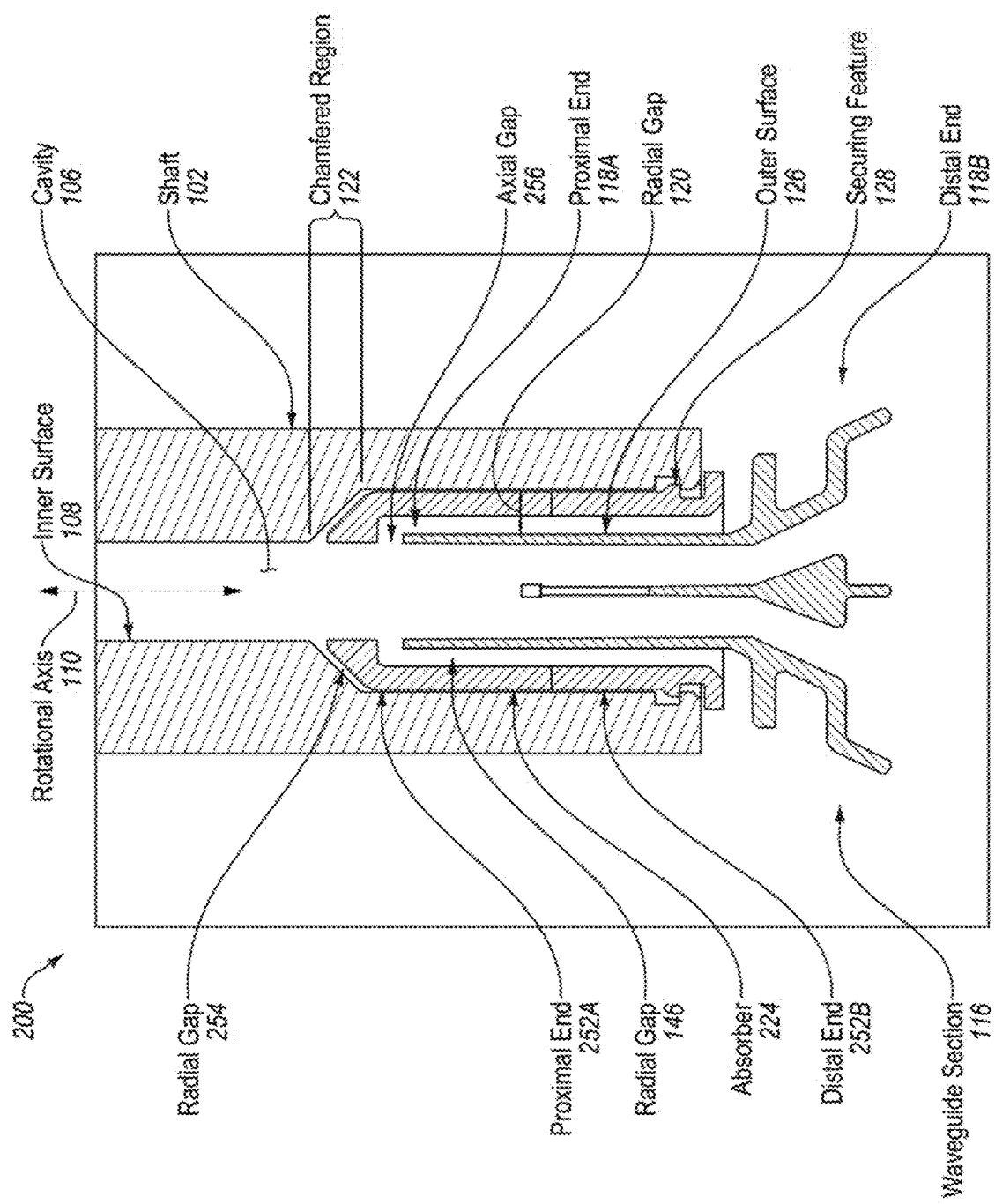
FIG. 2A is a diagram illustrating an absorber of a rotary joint, in accordance with implementations of the disclosure.

FIG. 2A is a diagram illustrating an absorber of a rotary joint, in accordance with implementations of the disclosure. Diagram 200 illustrates absorber 224. Absorber 224 is similar to absorber 124 of FIG. 1A-1B. Some elements of FIG. 1A-1B are used to help illustrate absorber 224.

In some implementations, the absorber 224 is secured to the shaft 102 and is configured to rotate along with the shaft 102 about the rotational axis 110. In some implementations, absorber 224 includes a securing feature 128 to secure the absorber 124 to the laterally adjacent portion of the inner surface 108 of the shaft 102. In some implementations, the outer surface (at least in part) of absorber 224 contacts the inner surface 108 of shaft 102 located below the chamfered region 122.

In some implementations, the absorber 224 can be positioned such that the "effective" radial gap 120 is reduced. A radial gap 146 is smaller than radial gap 120. The radial gap 146 shows a radial clearance between the outer surface 126 of the waveguide section 116 and the laterally adjacent inner surface of absorber 224. The radial gap 146 maintains a radial clearance between the waveguide section 116 and absorber 224 to allow the shaft 102 and the absorber 224 to rotate about the rotational axis 110 and with respect to waveguide section 116 without contacting the outer surface 126 of waveguide section 116. In some implementations, the radial gap 146 can range from 0.25 mm to 3 mm.

In some implementations, the proximal end 252A of absorber 224 extents vertically beyond the proximal end 118A of waveguide section 116 and into the cavity 106 of shaft 102. As illustrated, a portion of the proximal end 252A of the absorber 224 is located vertically adjacent (e.g., directly vertically adjacent) to the proximal end 118A of the waveguide section 116. An axial gap 256 is maintained between the proximal end 118A of waveguide section 116 and the vertically adjacent inner surface of the proximal end 252A of absorber 224. In some implementations, the axial gap can be ±3 mm.

In some implementations and as illustrated, the proximal end 252A of absorber 224 extends into the chamfered region 122 of shaft 102. In some implementations, the portion of the absorber 224 that is laterally adjacent to the chamfered region 122 of shaft 102 can be tapered at a similar angle (e.g., ±5 degrees) as the chamfered region 122. In some implementations, a radial gap 254 is maintained between the inner surface 108 of the shaft 102 (e.g. proximal end 252A of the absorber 224) at the chamfered region 122 and the laterally adjacent outer surface of the absorber 224 (as illustrated). In other implementations, the inner surface 108 of shaft 102 at the chamfered region 122 and laterally adjacent outer surface of the absorber 124 contact each other (at least in part) and do not have a radial gap.

In some implementations, the proximal end 252A of the absorber 224 can have an inner circumference (e.g., inner diameter) that is similar to one or more of the inner surface 108 of shaft 102 above the chamfered region 122 (e.g., ±0.5 mm) or the inner circumference (e.g., inner diameter) of the waveguide section 116 (e.g., ±0.5 mm).

Figure 2B:
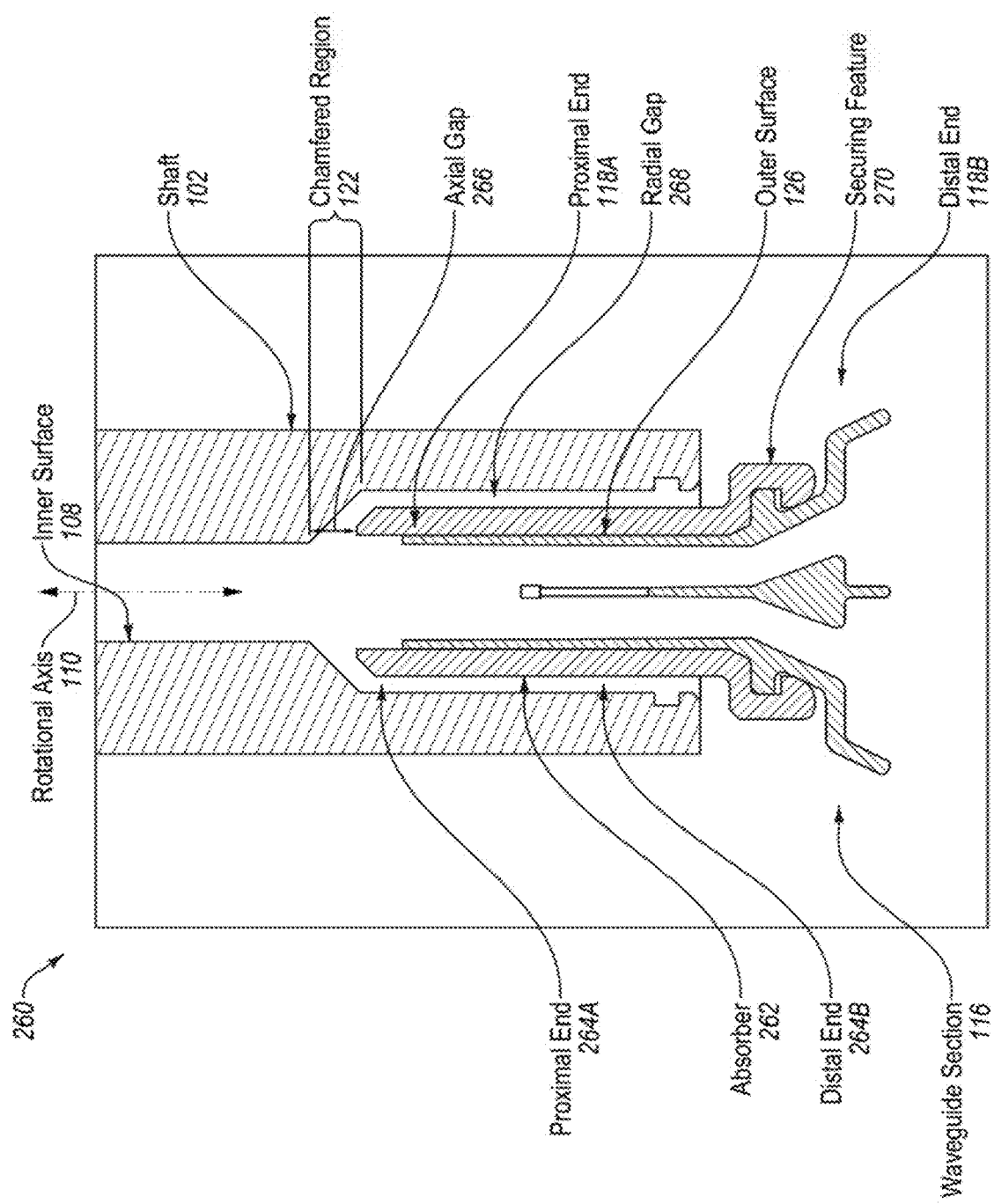
FIG. 2B is a diagram illustrating an absorber of a rotary joint, in accordance with implementations of the disclosure.

FIG. 2B is a diagram illustrating an absorber of a rotary joint, in accordance with implementations of the disclosure. Diagram 260 illustrates absorber 262. Some elements of FIG. 1A-1B are used to help illustrate absorber 262.

In some implementations, the absorber 262 can be secured to waveguide section 116. Absorber 262 is configured such that shaft 102 (and waveguide section 112) rotate about rotational axis 110 and with respect to absorber 262 and waveguide section 116. In some implementations, absorber 262 includes one or more securing features, such as securing feature 270 that secures absorber 262 to waveguide section 116. In some implementations, the at least part of inner surface of the absorber 262 contacts the outer surface 126 of the waveguide section 116. For example, the inner surface at the proximal end 264A of the absorber 262 contacts the outer surface 126 at the proximal end 118A of waveguide section 116.

In some implementations, a radial gap 268 is maintained between the outer surface of the absorber 262 and the laterally adjacent inner surface 108 of shaft 102. In some implementations, the radial gap can be between 0.25 mm-3 mm. The radial gap 268 can be used maintain axial clearance for unimpeded rotation of the shaft 102 with respect to absorber 262 and the waveguide section 116.

In some implementations, a portion of the proximal end 264A of absorber 262 extends vertically past the proximal end 118A of waveguide section 116. In some implementations and as illustrated, the proximal end 264A of absorber 262 extends into the chamfered region 122 of shaft 102. In some implementations, the portion of the absorber 262 that is laterally (radially) adjacent to the chamfered region 122 of shaft 102 can be tapered at a similar angle (e.g., ±5 degrees) as the chamfered region 122. In some implementations, a radial gap 268 is maintained between the inner surface 108 of the shaft 102 at the chamfered region 122 and the laterally adjacent outer surface of the absorber 262 (as illustrated).

In some implementations, an axial gap 266 is maintained between the proximal end 264A of the absorber 262 and the inner surface 108 of shaft 102 (e.g., at chamfered region 122) located vertically above the absorber 262. In some implementations, the axial gap 266 can be ±3 mm.

In some implementations, the proximal end 264A of absorber 262 can have an inner circumference (e.g., inner diameter) that is similar to the outer circumference (e.g., outer diameter) of the waveguide section 116 (e.g., ±0.5 mm).

FIG. 3A is a diagram illustrating interface absorbers of a rotary joint, in accordance with implementations of the disclosure. Diagram 300 illustrates top-down view of interface absorbers 302A and 302B (generally referred to as "interface absorbers 302" herein). Diagram 310 illustrates a profile view of interface absorbers 302 fitted at waveguide section 116. Interface absorber 302A corresponds to channel A of the rotary joint. Interface absorber 302B corresponds to channel B of rotary joint. Interface absorber 302A and interface absorber 302B are mirror images of one another. Some elements of FIG. 1A-1B are used to help illustrate interface absorbers 302.

In diagram 300, interface absorber 302A is shown with opening 304A that extends through the top surface 306A of a top side of interface absorber 302A through a bottom surface of a top side of the interface absorber 302A. Similarly, interface absorber 302B is shown with opening 304B that extends from the top surface 306B of a top side of interface absorber 302B through a bottom surface of the top side of interface absorber 302B. Interface absorbers 302 are illustrated with 6 sides (top, bottom, and 4 lateral sides) for purposes of illustration, rather than limitation. In some implementations, interface absorbers 302 can include only the top side, or the top side and one or more of the remaining 5 sides.

In diagram 310, interface absorbers 302 have been positioned between the distal end 118B of waveguide section 116 and a circuit board 314. Interface absorber 302B will be described in more detail below. It should be understood that interface absorber 302A of channel A can have similar if not the same features as interface absorber 302B of channel B. As illustrated, interface absorber 302B encases electronic device 142B but for opening 304B and some additional openings at the bottom side of interface absorber 302B that allow electronic device 142B to electrically couple to the circuit board 314 (via electrical contacts). In some implementations, the interface absorber 302B does not include a bottom side but does include the 5 remaining sides. As illustrated, a axial gap 312 (e.g., ±0.5 mm) exists between the at least part of top side of electronic device 142B and at least part of the bottom surface of the top side of the interface absorber 302B. In some implementations, the outer edges of the bottom surface of the top side of the interface absorber 302B can contact the top surface of the electronic device 142B. The top surface 306B of interface absorber 302B contacts the vertically adjacent outer surface 126 of the distal end 118B of waveguide section 116. The opening 304A of interface absorber 302B is configured to align with the channel opening 136B of waveguide section 116. The opening 304B allows the electromagnetic signal to be transmitted through the interface absorber 302B to the channel opening 136B and into the distal end 118B of waveguide section 116. In other implementations, a smaller axial gap or no axial gap is implemented between the bottom surface of the top side of interface absorber 302B can contact the top surface of electronic device 142B. It can be noted that in some embodiments the features illustrated or described for a particular interface absorber (e.g., interface absorber 302) can be combined with other features illustrated or described for one or more other interface absorbers (e.g., interface absorber 322 or interface absorber 332 of FIGS. 3B and 3C, respectively). In some embodiments, the interface absorber 302 (e.g. inner surface of the top side of the interface absorber 302) can contact (in part or in the entirety) the top surface of the electronic device 142 such that the axial gap 312 as illustrated is decreased or eliminated. The inner surface of the sides of the interface absorber 302 can contact (in part or in the entirety) the corresponding sides of the electronic device 142. The bottom surface of the interface absorber 302 can contact (in part or in the entirety) the adjacent surface of the circuit board 314. In some embodiments, the top surface 306B of the interface absorber 302 can contact (in part or in the entirety) the outer surface of the 126 of the distal end 118B of the waveguide section 116.

FIG. 3B is a diagram illustrating interface absorbers of a rotary joint, in accordance with implementations of the disclosure. Diagram 320 illustrates a profile view of interface absorber 322A and 322B (generally referred to as "interface absorbers 322" herein) fitted at waveguide section 116. Interface absorber 322A corresponds to channel A of the rotary joint. Interface absorber 322B corresponds to channel B of rotary joint. Interface absorber 322A and interface absorber 322B are mirror images of one another, and are similar to interface absorbers 302 of FIG. 3A unless otherwise described. Some elements of FIG. 1A-1B are used to help illustrate interface absorbers 322.

As illustrated, the bottom surface of the top side of interface absorber 322B contacts the top side of electronic device 142B. An axial gap 324 exists between at least part of the top surface 306B of the top side of interface absorber 322B and vertically adjacent outer surface 126 of the distal end 118B of waveguide section 116. As illustrated, some portion, such as the outer edges of the top surface 306B of the top side of interface absorber 322B can contact the vertically adjacent outer surface 126 of the distal end 118B of waveguide section 116. In other implementations, a smaller axial gap or no axial gap is implemented between top surface 306B of the top side of interface absorber 322B and vertically adjacent outer surface 126 of the distal end 118B of waveguide section 116.

FIG. 3C is a diagram illustrating interface absorbers of a rotary joint, in accordance with implementations of the disclosure. Diagram 330 illustrates a profile view of interface absorber 332A and 332B (generally referred to as "interface absorbers 332" herein) fitted at waveguide section 116. Interface absorber 332A corresponds to channel A of the rotary joint. Interface absorber 332B corresponds to channel B of the rotary joint. Interface absorber 332A and interface absorber 332B are mirror images of one another, and are similar to interface absorbers 302 of FIG. 3A and interface absorbers 322 of FIG. 3B, unless otherwise described. Some elements of FIG. 1A-1B are used to help illustrate interface absorbers 332.

Interface absorbers 332 are shown as a planar absorber. As illustrated, interface absorber 332B has no axial gap between the top surface 306B of the top side of interface absorber 332B and the vertically adjacent outer surface 126 of the distal end 118B of waveguide section 116. Interface absorber 332B also does not have an axial gap between the bottom surface of the top side of interface absorber 332B and vertically adjacent top surface of the top side of the electronic device 142B. In other implementations, interface absorber 332B (or interface absorber 332B) can implement one or more axial gaps, such an axial gap 312 of FIG. 3A or axial gap 324 of FIG. 3B.

Figure 4A:
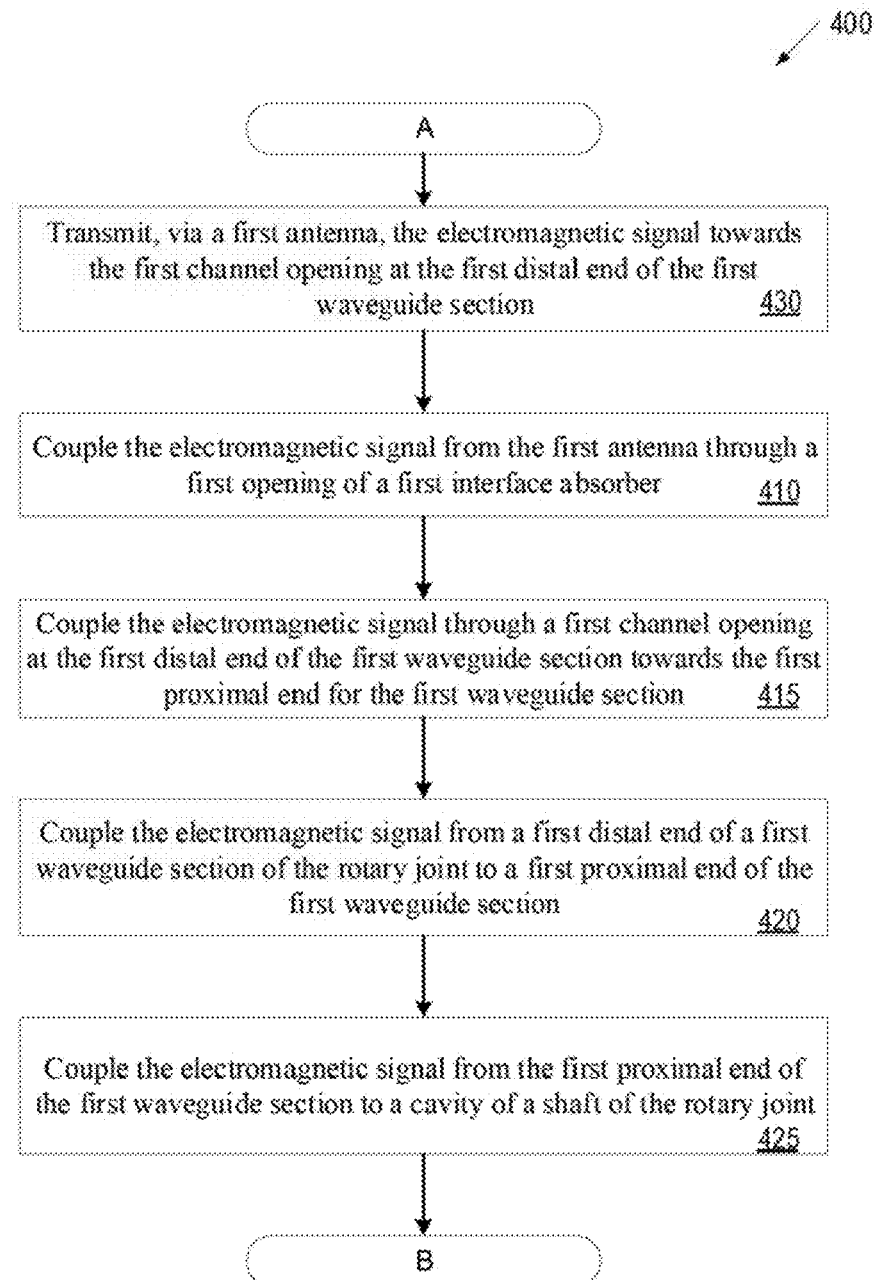
FIG. 4A-B illustrates a flow diagram for transmitting an electromagnetic signal using a rotary joint, in accordance with some implementations of the disclosure.
Figure 4B:
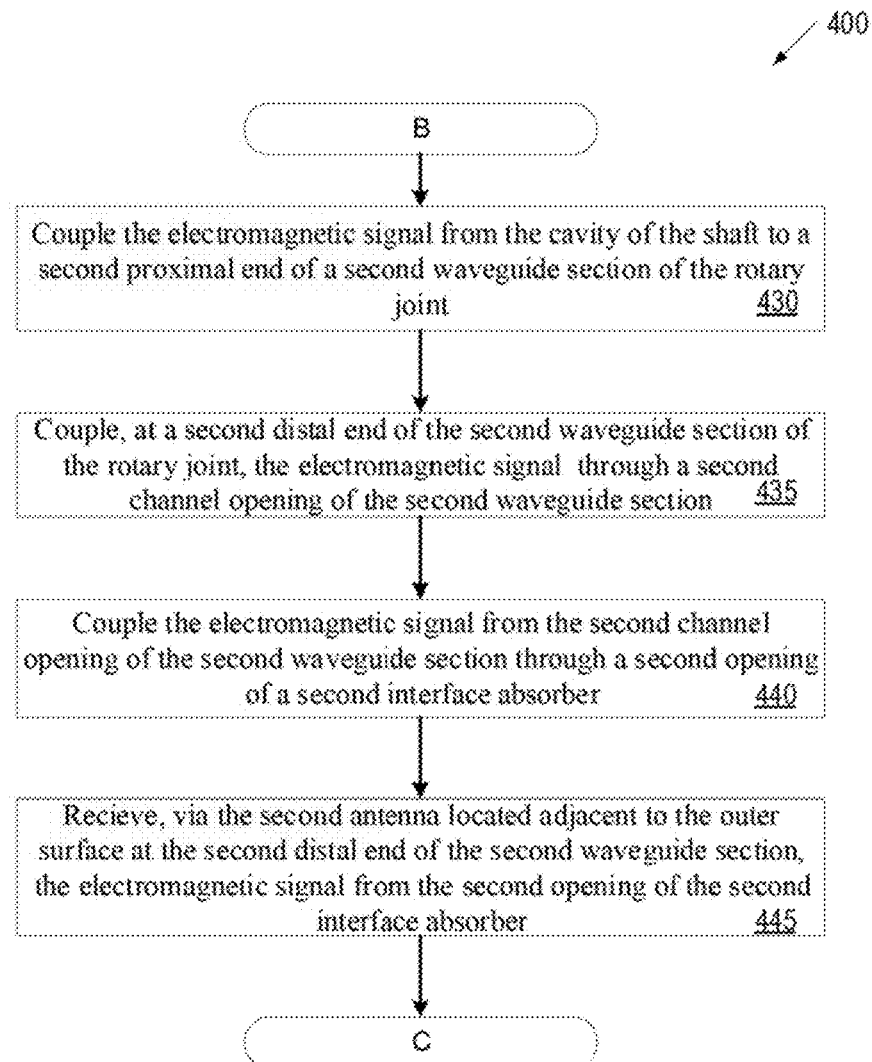

FIGS. 4A-B illustrate a flow diagram for transmitting an electromagnetic signal using a rotary joint, in accordance with some implementations of the disclosure.

Elements of FIGS. 1A-3C may be described below to help illustrate method 400 of FIG. 4A-B. It may be noted that method 400 may be performed in any order and may include the same, different, more, or fewer operations. It may be further noted that method 400 may be performed by one or more elements of a rotary joint, as described herein. In other implementations, a different type of rotary joint or the elements thereof can be used to perform one or more of the operations of method 400.

At operation 405, a first antenna of the rotary joint transmits the electromagnetic signal towards the first channel opening at the first distal end of the first waveguide section. The antenna is located adjacent to an outer surface at the first distal end of the first waveguide section.

At operation 410, the rotary joint couples (e.g., directs) the electromagnetic signal from the first antenna through a first opening of a first interface absorber. The first interface absorber is positioned at a first interface area between the first antenna and the outer surface at the first distal end of the first waveguide section. The first opening of the first interface absorber is aligned with the first channel opening at the first distal end of the first waveguide section.

At operation 415, the rotary joint couples the electromagnetic signal through a first channel opening at the first distal end of the first waveguide section towards the first proximal end for the first waveguide section.

At operation 420, the rotary joint couples an electromagnetic signal from a first distal end of a first waveguide section of the rotary joint to a first proximal end of the first waveguide section.

At operation 425, the rotary joint couples the electromagnetic signal from the first proximal end of the first waveguide section to a cavity of a shaft of the rotary joint. The cavity is defined by an inner surface of the shaft and extends from a first end of the shaft to a second end of the shaft, wherein the first proximal end of the first waveguide section is positioned within the cavity of the shaft and secured to the inner surface of the shaft.

At operation 430, rotary joint couples the electromagnetic signal from the cavity of the shaft to a second proximal end of a second waveguide section of the rotary joint. The second proximal end of the second waveguide section is positioned within the cavity of the shaft and unsecured to the inner surface of the shaft to form a radial gap between an outer surface of the second proximal end and a laterally adjacent portion of the inner surface of the shaft. The shaft and the first waveguide section are configured to rotate about a rotational axis and relative to the second waveguide section.

In some implementations, coupling the electromagnetic signal from the cavity of the shaft to a second proximal end of a second waveguide section of the rotary joint includes coupling the electromagnetic signal from the cavity of the shaft through an opening in an absorber that is positioned around the outer surface of the second proximal end of the second waveguide section and between the outer surface of the second proximal end of the second waveguide section and the laterally adjacent portion of the inner surface of the shaft.

At operation 435, rotary joint couples, at a second distal end of the second waveguide section of the rotary joint, the electromagnetic signal through a second channel opening of the second waveguide section.

At operation 440, rotary joint couple the electromagnetic signal from the second channel opening of the second waveguide section through a second opening of a second interface absorber. The second interface absorber is positioned at a second interface area between a second antenna and an outer surface of the second distal end of the second waveguide section.

At operation 445, rotary joint receives, via the second antenna located adjacent to the outer surface at the second distal end of the second waveguide section, the electromagnetic signal from the second opening of the second interface absorber.

Figure 5:
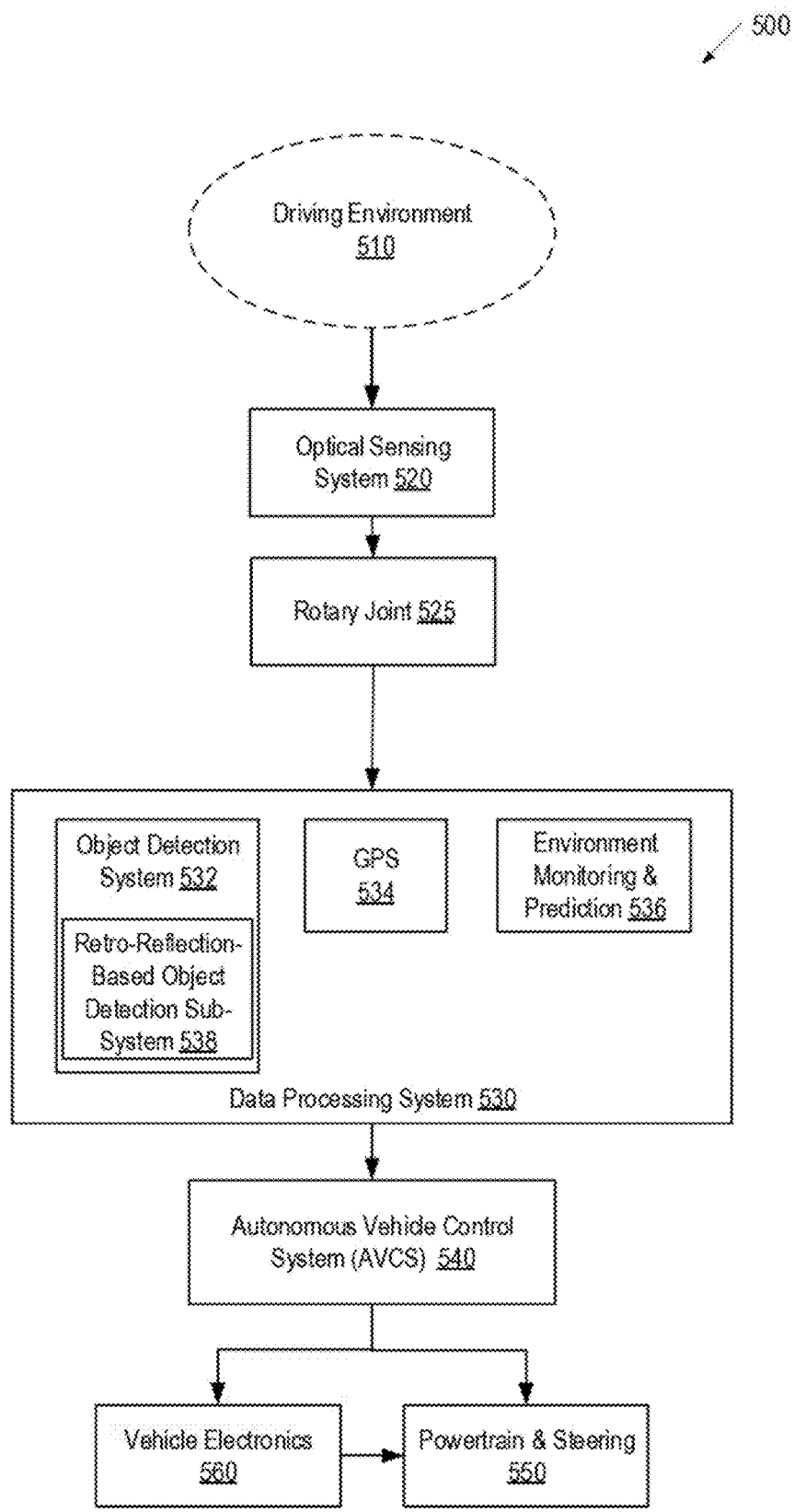
FIG. 5 is a diagram illustrating components of an exemplary autonomous vehicle that uses a rotary joint, in accordance with some implementations of the disclosure.

FIG. 5 is a diagram illustrating components of an exemplary autonomous vehicle that uses a rotary joint, in accordance with some implementation of the present disclosure. FIG. 5 illustrates operations of the exemplary autonomous vehicle (AV) as used under actual driving conditions. Autonomous vehicles may include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles capable of being operated in a self-driving mode (without a human input or with a reduced human input).

Autonomous (self-driving) vehicles operate by sensing an outside environment with various electromagnetic (radar and optical) sensors and charting a driving path through the environment based on the sensed data. Additionally, the driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, streetlights, etc.) is obtained from contemporaneous electromagnetic sensing data. Precision and safety of the driving path and of the speed regime selected by the autonomous vehicle depend significantly on the accuracy and completeness of the sensing data and on the ability of a driving algorithm to process the sensing data quickly and efficiently and to output correct instructions to the vehicle controls and the drivetrain.

An autonomous vehicle may employ LiDAR technology to detect distances to various objects in the environment and the velocities of such objects. A LiDAR emits one or more laser signals (pulses) that travel to an object and detects the arrived signals retro-reflected back from the object. By determining a time delay between the signal emission and the arrival of the retro-reflected waves, the LiDAR can determine a distance to the object. Furthermore, the LiDAR can determine the velocity (speed and direction of motion) of the object by emitting two or more signals in a quick succession and detecting a changing position of the object with each additional signal. The intervals between successive signals can be short enough so that in the meantime the object does not change its position appreciably in relation to other objects of the environment, but still long enough to allow the LiDAR to detect small changes in the object's position with a high accuracy. In some instances, LiDAR can determine the velocity of the object by emitting one or more signals and measuring the doppler shift of the return signal (s), as can be the case for coherent LiDAR systems.

A driving environment 510 may include any objects (animated or non-animated) located outside the AV, such as roadways, buildings, trees, bushes, sidewalks, bridges, mountains, other vehicles, pedestrians, and so on. The driving environment 510 may be urban, suburban, rural, and so on. In some implementations, the driving environment 510 may be an off-road environment and/or an environment of a wilderness. In some implementations, the driving environment may be an indoor environment, e.g., the environment of an industrial plant, a shipping warehouse, a hazardous area of a building, and so on. In some implementations, the driving environment 510 may be substantially flat, with various objects moving parallel to a surface (e.g., parallel to the surface of Earth). In other implementations, the driving environment may be three-dimensional and may include objects (e.g., aircraft, submarines) that are capable of moving along all three directions. Hereinafter, the term "driving environment" will be understood to include all environments in which an autonomous motion of self-propelled vehicles may occur. For example, "driving environment" shall include any possible flying environment of an aircraft or a marine environment of a naval vessel. The objects of the driving environment 510 may be located at any distance from the AV, from close distances of several feet (or less) to several miles (or more).

The exemplary AV 500 may include an optical sensing system 520. The optical sensing system 520 may include various electromagnetic sensing subsystems and/or devices (e.g., distance sensing, velocity sensing, acceleration sensing, rotational motion sensing, and so on). For example, "optical" sensing may utilize a range of light visible to a human eye (e.g., the 380 to 700 nm wavelength range), the UV range (below 380 nm), the infrared range (above 700 nm), the microwave range (between 1 mm and 1 m), the radio frequency range (above 1 m), etc. In implementations, "optical" and "light" may include any other suitable range of the electromagnetic spectrum.

The optical sensing system 520 may include a radar unit, which may be any system that utilizes radio frequency signals to sense objects within the driving environment 510 of the AV 500. The radar unit may be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion. The term "velocity" may also include an angular velocity of the object's rotational motion.

The optical sensing system 520 may include a LiDAR unit (e.g., a LiDAR rangefinder), which may be a laser-based (or maser-based) unit capable of determining distances (e.g., using the time of signal propagation technology) to the objects in the driving environment 510. The LiDAR unit may utilize wavelengths of electromagnetic waves that are shorter than the wavelength of the radio waves and may, therefore, provide a higher spatial resolution and sensitivity compared with the radar unit. The LiDAR unit may include one or more laser sources to produce emitted signals and one or more detectors of the signals reflected from the objects. The LiDAR unit may include spectral filters to filter out spurious electromagnetic waves having wavelengths (frequencies) that are different from the wavelengths (frequencies) of the emitted signals. In some implementations, the LiDAR unit may include directional filters (e.g., apertures, diffraction gratings, and so on) to filter out electromagnetic waves that may arrive at the detectors along directions different from the retro-reflection directions for the emitted signals. The LiDAR unit may use various other optical components (lenses, mirrors, gratings, optical films, interferometers, spectrometers, local oscillators, and the like) to enhance sensing capabilities of the unit. The LiDAR unit may be configured to operate in an incoherent sensing mode or a coherent sensing mode (e.g., a mode that uses heterodyne detection).

In some implementations, the LiDAR unit may be a 360-degree unit in a horizontal direction. In some implementations, the LiDAR unit may be capable of spatial scanning along both the horizontal and vertical directions. In some implementations, the LiDAR field of view may be 90 degrees in the vertical direction (so that the entire upper hemisphere is covered by the LiDAR signals). In some implementations, the LiDAR field of view may be a full sphere (consisting of two hemispheres). For brevity and conciseness, when a reference to "LiDAR technology," "LiDAR sensing," "LiDAR data," "LiDAR system," and "LiDAR," in general, is made in the present disclosure, such reference shall be understood also to encompass other electromagnetic sensing technology, such as the radar technology, where applicable.

The optical sensing system 520 may further include one or more cameras to capture images of the driving environment 510. The images may be two-dimensional projections of the driving environment 510 (or parts of the driving environment 510) onto a projecting surface (flat or non-flat) of the camera. Some of the cameras of the optical sensing system 520 may be video cameras configured to capture continuous (or quasi-continuous) stream of images of the driving environment 510.

One or more sensing units of optical sensing system 520 can send optical sensing data obtained by optical sensing system to and from data processing system 530 using rotary joint 250, as described herein. For example, the LiDAR unit can be coupled to the waveguide section 112 of the rotary joint to allow the LiDAR unit to rotate 360 degrees. The LiDAR unit can send LiDAR sensing data to data processing system 530 using rotary joint 525.

The optical sensing data obtained by the optical sensing system 520 may be processed by a data processing system 530 of the AV 500. For example, the optical sensing system 520 may include an object detection system 532. The object detection system 532 may be configured to detect objects in the driving environment 510 and to recognize the detected objects. For example, the object detection system 532 may analyze images captured by the cameras of the object detection system 532 and may be capable of determining traffic light signals, road signs, roadway layouts (e.g., boundaries of traffic lanes, topologies of intersections, designations of parking places, and so on), presence of obstacles, and the like. The object detection system 532 may further receive the LiDAR (including radar, if applicable) sensing data to determine distances to various objects in the environment 510 and velocities of such objects. In some implementations, the object detection system 532 may use the LiDAR data in combination with the data captured by the camera(s). In one exemplary implementation, the camera(s) may detect an image of a rock partially obstructing a traffic lane. Using the data from the camera(s), the object detection system 532 may be capable of determining the angular size of the rock, but not the linear size of the rock. Using the LiDAR data, the object detection system 532 may determine the distance from the rock and, therefore, by combining the distance information with the angular size of the rock, the object detection system 532 may determine the linear dimensions of the rock as well.

In another exemplary implementation, using the LiDAR data, the object detection system 532 may determine how far a detected object is from the AV and may further determine the component of the object's velocity along the direction of the AV's motion. Furthermore, using a series of quick images obtained by the camera, the object detection system 532 may also determine the lateral velocity of the detected object in a direction perpendicular to the direction of the AV's motion. In some implementations, the lateral velocity may be determined from the LiDAR data alone, for example, by recognizing an edge of the object (using horizontal scanning) and further determining how quickly the edge of the object is moving in the lateral direction.

The object detection system 532 may further receive sensing information from a GPS transceiver configured to obtain information about the position of the AV relative to Earth. The GPS data processing module 534 may use the GPS data in conjunction with the optical sensing data to help accurately determine location of the AV with respect to fixed objects of the driving environment 510, such as roadways, intersections, surrounding buildings, and so on.

In some implementations, the object detection system 532 can include retro-reflection-based object detection sub-system 538 that measures the retro-reflectivity of an object, and uses the measurement to classify the object. As noted above, the retro-reflectometer, as described herein, can be used to determine, obtain, derive or verify the retro-reflectivity of the target (e.g., retro-reflectivity data), which in turn can be used to calibrate or train the retro-reflection-based object detection sub-system 538. In some implementations, retro-reflection-based object detection sub-system 538 may be trained using simulations of virtual driving environments that may include retro-reflection data for various objects or materials derived or obtained from a retro-reflectometer, as described herein.

The data processing system 530 may further include an environment monitoring and prediction component 536, which may monitor how the driving environment 510 evolves with time, e.g., by keeping track of the locations and velocities of the animated objects (relative to Earth). In some implementations, the environment monitoring and prediction component 536 may keep track of the changing appearance of the environment due to motion of the AV relative to the environment. In some implementations, the environment monitoring and prediction component 536 may make predictions about how various animated objects of the driving environment 510 will be positioned within a prediction time horizon. The predictions may be based on the current locations and velocities of the animated objects as well as on the tracked dynamics of the animated objects during a certain (e.g., pre-determined) period of time. For example, based on stored data for object 1 indicating accelerated motion of object 1 during the previous 3-second period of time, the environment monitoring and prediction component 536 may conclude that object 1 is resuming its motion from a stop sign or a red traffic light signal. Accordingly, the environment monitoring and prediction component 536 may predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 536 may conclude that object 2 is stopping at a stop sign or at a red traffic light signal. Accordingly, the environment monitoring and prediction component 536 may predict where object 2 is likely to be within the next 1 or 3 seconds. The environment monitoring and prediction component 536 may perform periodic checks of the accuracy of its predictions and modify the predictions based on new data obtained from the optical sensing system 520.

The data generated by the object detection system 532, the GPS data processing module 534, and the environment monitoring and prediction component 536 may be used by an autonomous driving system, which may be an autonomous vehicle control system (AVCS) 540. The AVCS 540 may include one or more algorithms that control how the AV 500 is to behave in various driving situations and environments. For example, the AVCS 540 may include a navigation system for determining a global driving route to a destination point. The AVCS 540 may also include a driving path selection system for selecting a particular path through the immediate driving environment, which may include selecting a traffic lane, negotiating a traffic congestion, choosing a place to make a U-turn, selecting a trajectory for a parking maneuver, and so on. The AVCS 540 may also include an obstacle avoidance system for safe avoidance of various obstructions (rocks, stalled vehicles, a jaywalking pedestrian, and so on) within the driving environment of the AV. The obstacle avoidance system may be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 540 may generate instructions for various systems and components of the vehicle, such as the powertrain and steering 560, vehicle electronics 562, and other systems and components not explicitly shown in FIG. 5. The powertrain and steering 560 may include an engine (internal combustion engine, electric engine, and so on), transmission, differentials, axles, wheels, steering mechanism, and other systems. The vehicle electronics 562 may include an on-board computer, engine management, ignition, communication systems, carputers, telematics, in-car entertainment systems, and other system and components. Some of the instructions output by the AVCS 540 may be delivered directly to the powertrain and steering 560 whereas other instructions output by the AVCS 540 are first delivered to the vehicle electronics 562, which generate commands to the powertrain and steering 560.

In one example, the AVCS 540 may determine that an obstacle identified by the data processing system 530 is to be avoided by decelerating the vehicle until a safe speed is reached, followed by steering the vehicle around the obstacle. The AVCS 540 may output instructions to the powertrain and steering 560 (directly or via the vehicle electronics 562) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 540 may output instructions to the powertrain and steering 560 to resume the previous speed settings of the vehicle.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "modulating", "emitting", "detecting", "receiving", "generating", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "some implementations" is not intended to mean the same implementation or implementations unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A rotary joint, comprising:
   a shaft comprising a first end, a second end, and a cavity defined by an inner surface of the shaft and extending through the shaft from the first end to the second end, and wherein the shaft is oriented along a rotational axis that extends between the first end and the second end;
   a first waveguide section oriented along the rotational axis and comprising a first proximal end and a first distal end, wherein the first proximal end of the first waveguide section is positioned within the cavity of the shaft and secured to the inner surface of the shaft; and
   a second waveguide section oriented along the rotational axis and comprising a second proximal end and a second distal end, wherein the second proximal end of the second waveguide section is positioned within the cavity of the shaft and unsecured to the inner surface of the shaft to form a radial gap between an outer surface of the second proximal end and a laterally adjacent portion of the inner surface of the shaft, wherein at least a portion of the cavity of the shaft defines an inner surface of the rotary joint, and wherein the shaft and the first waveguide section are configured to rotate about the rotational axis and relative to the second waveguide section.

2. The rotary joint of claim 1, wherein a first circumference of the inner surface of the shaft at the first end is different than a second circumference of the inner surface of the shaft at the second end.

3. The rotary joint of claim 2, wherein the inner surface of the shaft comprises a chamfered region located at an interface between the inner surface of the shaft having the first circumference and the inner surface of the shaft having the second circumference, wherein the chamfered region is configured at an angle that is greater than 10 degrees and less than 90 degrees with respect to the inner surface of the shaft adjacent the chamfered region.

4. The rotary joint of claim 1, further comprising:
   an absorber positioned around the outer surface of the second proximal end of the second waveguide section and between the outer surface of the second proximal end of the second waveguide section and the laterally adjacent portion of the inner surface of the shaft.

5. The rotary joint of claim 4, wherein the absorber comprises:
   a first securing feature to secure the absorber to the outer surface of the second proximal end of the second waveguide section, wherein the absorber is configured to remain stationary as the shaft and the first waveguide section rotate about the rotational axis.

6. The rotary joint of claim 4, wherein the absorber comprises:
   a second securing feature to secure the absorber to the laterally adjacent portion of the inner surface of the shaft, wherein the absorber is configured to rotate about the rotational axis as the second waveguide section remains stationary.

7. The rotary joint of claim 1,
   wherein the first waveguide section comprises:
      a first septum aligned along the rotational axis and extending from the first distal end towards the first proximal end of the first waveguide section; and
      a first channel opening extending through an outer surface at the first distal end of the first waveguide section to an inner surface at the first distal end of the first waveguide section, wherein the first channel opening is adjacent to the first septum; and
   wherein the second waveguide section comprises:
      a second septum aligned along the rotational axis and extending from the second distal end towards the second proximal end of the second waveguide section; and
      a second channel opening extending through an outer surface at the second distal end of the second waveguide section to an inner surface at the second distal end of the second waveguide section, wherein the second channel opening is adjacent to the second septum, and wherein the first waveguide section and the second waveguide section are configured to propagate electromagnetic signals through the cavity via the first channel opening and the second channel opening.

8. The rotary joint of claim 7, further comprising:
   an interface absorber positioned at an interface area between an antenna and the outer surface at the first distal end of the first waveguide section, the interface absorber comprising an opening that aligns with the first channel opening.

9. The rotary joint of claim 8, wherein the interface absorber comprises:
   a top inner surface comprising the opening;
   a plurality of side surfaces, wherein the top inner surface and the plurality of side surfaces contact a package comprising the antenna; and
   a bottom surface that contact a circuit board that is coupled to the package.

10. A method of electromagnetic signal transmission using a rotary joint, comprising:
   coupling an electromagnetic signal from a first distal end of a first waveguide section of the rotary joint to a first proximal end of the first waveguide section;
   coupling the electromagnetic signal from the first proximal end of the first waveguide section to a cavity of a shaft of the rotary joint, wherein the cavity is defined by an inner surface of the shaft and extends from a first end of the shaft to a second end of the shaft, wherein the first proximal end of the first waveguide section is positioned within the cavity of the shaft and secured to the inner surface of the shaft; and
   coupling the electromagnetic signal from the cavity of the shaft to a second proximal end of a second waveguide section of the rotary joint, wherein the second proximal end of the second waveguide section is positioned within the cavity of the shaft and unsecured to the inner surface of the shaft to form a radial gap between an outer surface of the second proximal end and a laterally adjacent portion of the inner surface of the shaft, wherein at least a portion of the cavity of the shaft defines an inner surface of the rotary joint, and wherein the shaft and the first waveguide section are configured to rotate about a rotational axis and relative to the second waveguide section.

11. The method of claim 10, further comprising:
   coupling the electromagnetic signal through a first channel opening at the first distal end of the first waveguide section towards the first proximal end for the first waveguide section; and
   coupling, at a second distal end of the second waveguide section of the rotary joint, the electromagnetic signal through a second channel opening of the second waveguide section.

12. The method of claim 11, further comprising:
   transmitting, via a first antenna located adjacent to an outer surface at the first distal end of the first waveguide section, the electromagnetic signal towards the first channel opening at the first distal end of the first waveguide section.

13. The method of claim 12, further comprising:
   coupling the electromagnetic signal from the first antenna through a first opening of a first interface absorber that is positioned at a first interface area between the first antenna and the outer surface at the first distal end of the first waveguide section, wherein the first opening of the first interface absorber is aligned with the first channel opening at the first distal end of the first waveguide section.

14. The method of claim 13, further comprising:
   coupling the electromagnetic signal from the second channel opening of the second waveguide section through a second opening of a second interface absorber that is positioned at a second interface area between a second antenna and an outer surface of the second distal end of the second waveguide section; and
   receiving, via the second antenna located adjacent to the outer surface at the second distal end of the second waveguide section, the electromagnetic signal from the second opening of the second interface absorber.

15. The method of claim 10, wherein coupling the electromagnetic signal from the cavity of the shaft to the second proximal end of the second waveguide section of the rotary joint, further comprises:
   coupling the electromagnetic signal from the cavity of the shaft through an opening in an absorber that is positioned around the outer surface of the second proximal end of the second waveguide section and between the outer surface of the second proximal end of the second waveguide section and the laterally adjacent portion of the inner surface of the shaft.

16. A system comprising:
   a first antenna;
   a second antenna; and
   a rotary joint to couple an electromagnetic signal transmitted from the first antenna to the second antenna, the rotary joint comprising:
      a shaft comprising a first end, a second end, and a cavity defined by an inner surface of the shaft and extending through the shaft from the first end to the second end, and wherein the shaft is oriented along a rotational axis that extends between the first end and the second end;
      a first waveguide section oriented along the rotational axis and comprising a first proximal end and a first distal end, wherein the first proximal end of the first waveguide section is positioned within the cavity of the shaft and secured to the inner surface of the shaft; and
      a second waveguide section oriented along the rotational axis and comprising a second proximal end and a second distal end, wherein the second proximal end of the second waveguide section is positioned within the cavity of the shaft and unsecured to the inner surface of the shaft to form a radial gap between an outer surface of the second proximal end and a laterally adjacent portion of the inner surface of the shaft, wherein at least a portion of the cavity of the shaft defines an inner surface of the rotary joint, and wherein the shaft and the first waveguide section are configured to rotate about the rotational axis and relative to the second waveguide section.

17. The system of claim 16, wherein a first circumference of the inner surface of the shaft at the first end is different than a second circumference of the inner surface of the shaft at the second end.

18. The system of claim 17, wherein the inner surface of the shaft comprises a chamfered region located at an interface between the inner surface of the shaft having the first circumference and the inner surface of the shaft having the second circumference, wherein the chamfered region is configured at an angle that is greater than 10 degrees and less than 90 degrees with respect to the inner surface of the shaft adjacent the chamfered region.

19. The system of claim 16, wherein the rotary joint further comprises:
   an absorber of the positioned around the outer surface of the second proximal end of the second waveguide section and between the outer surface of the second proximal end of the second waveguide section and the laterally adjacent portion of the inner surface of the shaft.

20. The system of claim 16, wherein the first waveguide section of the rotary joint comprises:

a first septum aligned along the rotational axis and extending from the first distal end towards the first proximal end of the first waveguide section; and a first channel opening extending through an outer surface at the first distal end of the first waveguide section to an inner surface at the first distal end of the first waveguide section, wherein the first channel opening is adjacent to the first septum; and wherein the second waveguide section of the rotary joint comprises:

a second septum aligned along the rotational axis and extending from the second distal end towards the second proximal end of the second waveguide section; and a second channel opening extending through an outer surface at the second distal end of the second waveguide section to an inner surface at the second distal end of the second waveguide section, wherein the second channel opening is adjacent to the second septum, and wherein the first waveguide section and the second waveguide section are configured to propagate electromagnetic signals through the cavity of the shaft via the first channel opening and the second channel opening.

\* \* \* \* \*